United States Patent
Sasaki et al.

(10) Patent No.: US 10,042,291 B2
(45) Date of Patent: *Aug. 7, 2018

(54) INTERMEDIATE TRANSFER MEMBER, IMAGE FORMING APPARATUS AND IMAGE FORMING METHOD

(71) Applicant: Konica Minolta, Inc., Tokyo (JP)

(72) Inventors: Teruo Sasaki, Tokyo (JP); Akihiro Honya, Tokyo (JP); Shinichi Yabuki, Kanagawa (JP); Shinichi Hamaguchi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,948

(22) Filed: Jun. 13, 2017

(65) Prior Publication Data

US 2017/0357191 A1    Dec. 14, 2017

(30) Foreign Application Priority Data

Jun. 14, 2016    (JP) ................. 2016-118060

(51) Int. Cl.
- G03G 15/16    (2006.01)
- C08F 290/06   (2006.01)
- G03G 15/20    (2006.01)

(52) U.S. Cl.
CPC ....... G03G 15/162 (2013.01); C08F 290/062 (2013.01); G03G 15/206 (2013.01); G03G 15/2025 (2013.01)

(58) Field of Classification Search
CPC ................................................... G03G 15/206
See application file for complete search history.

(56) References Cited

FOREIGN PATENT DOCUMENTS

| JP | 2013024898 A | 2/2013 |
|----|--------------|--------|
| JP | 2013235165 A | 11/2013 |
| JP | 2015125187 A | 7/2015 |

*Primary Examiner* — Hoa V Le (74) *Attorney, Agent, or Firm* — Lucas & Mercanti, LLP

(57) ABSTRACT

According to the present invention, increase in a dynamic friction force can be suppressed and cleaning performance of a cleaning member can be improved under any operating environment without additionally providing a special mechanism. An intermediate transfer member includes a substrate layer and a surface layer, the surface layer contains a cured product of a polymerizable monomer, and the monomer contains a compound represented by the following formula (1):

$$A\text{-}[(L\text{-}B)_k\text{-}D]_m(D)_l \qquad (1)$$

wherein A represents a tetra- or higher-valent organic group, B independently represents an alkylene oxide group having 4 to 15 carbon atoms, D independently represents a (meth)acryloyl group, L independently represents —(CO)— or a single bond, k independently represents an integer of 1 or more, l represents an integer of 0 to 3, m represents an integer of 2 or more, and a sum of l and m represents an integer of 3 or more.

11 Claims, 3 Drawing Sheets

INTERMEDIATE TRANSFER MEMBER, IMAGE FORMING APPARATUS AND IMAGE FORMING METHOD

CROSS REFERENCE TO RELATED APPLICATIONS

This application is entitled to and claims the benefit of Japanese Patent Application No. 2016-118060, filed on Jun. 14, 2016, the disclosure of which including the specification, drawings and abstract is incorporated herein by reference in its entirety.

BACKGROUND OF THE INVENTION

1. Field of the Invention

The present invention relates to an intermediate transfer member, an image forming apparatus and an image forming method.

2. Description of Related Art

In an electrophotographic image forming apparatus, for example, a latent image formed on a photoconductor is developed with a toner, the thus obtained toner image is temporarily carried on an intermediate transfer member in the shape of an endless belt, and the toner image thus carried on the intermediate transfer member is transferred onto a recording medium such as paper. As such an intermediate transfer member, an endless belt (intermediate transfer belt) is known (see, for example, Japanese Patent Application Laid-Open No. 2013-024898).

An intermediate transfer belt described in Japanese Patent Application Laid-Open No. 2013-024898 includes a substrate layer made of a resin, and a surface layer disposed on the substrate layer and made of a curable resin. In using the intermediate transfer belt described in Japanese Patent Application Laid-Open No. 2013-024898, if a cleaning member made of an elastic body is disposed for cleaning the intermediate transfer belt, the dynamic friction force (dynamic torque) of the intermediate transfer belt may increase in some cases. In particular, the dynamic friction force of the intermediate transfer belt is liable to conspicuously increase under environments from the NN environment (20° C. and 50% RH) to the HH environment (30° C. and 80% RH). Besides, in using the intermediate transfer belt described in Japanese Patent Application Laid-Open No. 2013-024898, the cleaning member may be abraded instead of the intermediate transfer belt because of its excellent durability.

For solving this problem, a technique to reduce the dynamic friction force of the intermediate transfer member by mixing a lubricant in a toner is also known. The dynamic friction force of the intermediate transfer member cannot be sufficiently reduced in some cases, however, merely by employing this technique.

In addition, as a known technique to reduce the dynamic friction force of the intermediate transfer member, a dedicated apparatus for applying a lubricant is disposed in an image forming apparatus (see, for example, Japanese Patent Application Laid-Open No. 2013-235165). In this case, however, the number of components of the image forming apparatus unavoidably increases.

Besides, a technique to reduce the dynamic friction force by mixing a lubricant in the surface layer of the intermediate transfer belt is also known (see, for example, Japanese Patent Application Laid-Open No. 2015-125187). In an intermediate transfer belt described in Japanese Patent Application Laid-Open No. 2015-125187, it is necessary to abrade the surface of the intermediate transfer belt over time for causing a lubricant to be disposed on the surface of the intermediate transfer belt. In this case, it is necessary to design the intermediate transfer belt in such a manner as to appropriately reduce the durability thereof, and in order to attain both the durability and the reduction in the dynamic friction force, the thickness of the surface layer needs to be large.

SUMMARY OF THE INVENTION

In the intermediate transfer belts described in Japanese Patent Application Laid-Open No. 2013-024898, 2013-235165 and No. 2015-125187, the dynamic friction force is to be reduced in this manner, but from the viewpoint of improving the cleaning performance of the cleaning member while suppressing the increase in the dynamic friction force of the intermediate transfer belt, there still remains room for consideration.

Accordingly, a first object of the present invention is to provide an intermediate transfer member capable of suppressing the increase in the dynamic friction force and improving the cleaning performance of a cleaning member under any operating environment without additionally providing a special mechanism. Besides, a second object of the present invention is to provide an image forming apparatus including the intermediate transfer member. Furthermore, a third object of the present invention is to provide an image forming method using the intermediate transfer member.

To achieve at least the first object, an intermediate transfer member, including a substrate layer, and a surface layer disposed on the substrate layer, wherein the surface layer contains at least a cured product of a polymerizable monomer, and the monomer contains a compound represented by the following formula (1):

$$A\text{-}[(L\text{-}B)_k\text{-}D]_m(D)_l \qquad (1)$$

wherein A represents a tetra- or higher-valent organic group, B independently represents an alkylene oxide group having 4 to 15 carbon atoms, D independently represents a (meth)acryloyl group, L independently represents —(CO)— or a single bond, k independently represents an integer of 1 or more, l represents an integer of 0 to 3, m represents an integer of 2 or more, and a sum of l and m represents an integer of 3 or more.

To achieve at least the second object, an image forming apparatus, including: the intermediate transfer member according to claim 1 for carrying a toner image having been carried on a photoconductor to transfer the toner image onto a recording medium; and a cleaning apparatus for cleaning away toner particles remaining on a surface of the intermediate transfer member by bringing a cleaning member into contact with the surface of the intermediate transfer member from which the toner image has been transferred onto the recording medium.

To achieve at least the third object, an image forming method, including: a primary transferring step of transferring a toner image carried on a photoconductor onto an intermediate transfer member; a secondary transferring step of transferring the toner image carried on the intermediate transfer member onto a recording medium; and a cleaning step of cleaning away remaining toners remaining on a surface of the intermediate transfer member by bringing a cleaning member into contact with the surface of the intermediate transfer member after the secondary transferring step, wherein the intermediate transfer member according to claim 1 is used as the intermediate transfer member.

BRIEF DESCRIPTION OF DRAWINGS

The present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

An embodiment of the present invention will now be described in detail with reference to the accompanying drawings.

(Structure of Intermediate Transfer Member)

Figure 1A:
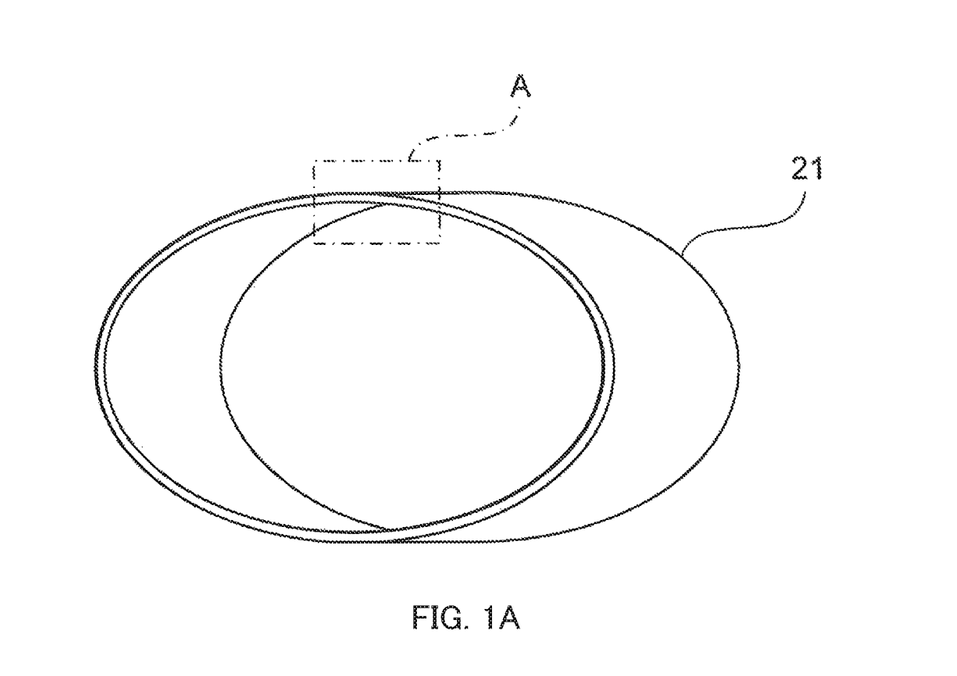
FIGS. 1A and 1B are diagrams illustrating the structure of an intermediate transfer member according to one embodiment of the present invention.
Figure 1B:
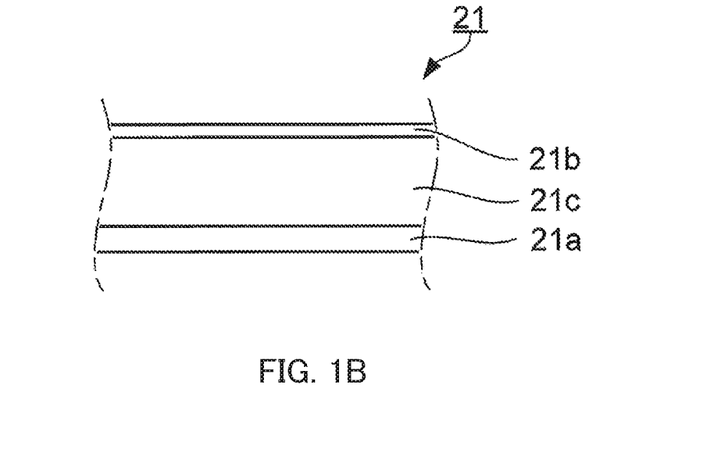

FIGS. 1A and 1B are diagrams illustrating the structure of intermediate transfer member 21. FIG. 1A is a perspective view of the intermediate transfer member, and FIG. 1B is a partially enlarged cross-sectional view of region A surrounded by an alternate long and short dash line in FIG. 1A.

Intermediate transfer member 21 is incorporated in an image forming apparatus, so that a toner image having been primarily transferred onto an electrostatic latent image carrier (a photoconductor) can be secondarily transferred onto a recording medium.

As illustrated in FIGS. 1A and 1B, intermediate transfer member 21 includes substrate layer 21a and surface layer 21b. Besides, substrate layer 21a is positioned on an inner side of intermediate transfer member 21, and surface layer 21b is positioned on an outer side thereof. It is noted that elastic layer 21c made of an elastic body may be disposed between substrate layer 21a and surface layer 21b. Elastic layer 21c may have any of known structures. Intermediate transfer member 21 is in the shape of an endless belt. Here, the term "shape of an endless belt" conceptually (geometrically) means a loop shape formed by, for example, linking ends of one long sheet-shaped material to each other. The actual shape of intermediate transfer member 21 is preferably a seamless belt shape or a cylindrical shape.

Substrate layer 21a is made of a resin, and the resin can be appropriately selected from resins that do not denature or deform in a temperature range where intermediate transfer member 21 is used. Examples of the resins to be used include polycarbonate, polyphenylene sulfide, polyvinylidene fluoride, polyimide, polyamide imide, polyalkylene terephthalate (such as polyethylene terephthalate and polybutylene terephthalate), polyether, polyether ketone, polyether ether ketone, an ethylene tetrafluoroethylene copolymer and polyamide. From the viewpoint of heat resistance and strength, the resin preferably contains polyimide, polycarbonate, polyphenylene sulfide or polyalkylene terephthalate, and more preferably contains polyphenylene sulfide or polyimide. Polyimide can be obtained by heating polyamic acid, that is, a precursor of polyimide. Besides, polyamic acid can be obtained by dissolving, in an organic polar solvent, a substantially equimolar mixture of tetracarboxylic dianhydride or a derivative thereof and diamine for causing a reaction in a solution state. Incidentally, if a polyimide-based resin is used for substrate layer 21a, a content of the polyimide-based resin in substrate layer 21a is preferably 51% or more.

Besides, substrate layer 21a preferably has an electrical resistance value (volume resistivity) falling in a range of $10^5$ to $10^{11}$ Ω·cm. In order to set the electrical resistance value of substrate layer 21a in a prescribed range, substrate layer 21a may contain, for example, a conductive substance. An example of the conductive substance includes carbon black. As the carbon black, neutral carbon black or acidic carbon black can be used. The conductive substance may be added in such an amount that the volume resistivity and the surface resistivity of intermediate transfer member 21 can fall in prescribed ranges although the amount is varied depending on the type of the conductive substance. The conductive substance may be added generally in an amount of 10 to 20 parts by weight with respect to 100 parts by weight of the resin, and preferably in an amount of 10 to 16 parts by weight with respect to 100 parts by weight of the resin.

Besides, the thickness of substrate layer 21a is preferably 50 to 200 μm. Furthermore, any of various known additives may be added to substrate layer 21a as long as the aforementioned functions can be exhibited. An example of the additives includes a dispersant such as a nylon compound.

Substrate layer 21a can be produced by any of known general methods. For example, a heat resistant resin used as a material is melted using an extruder, the melt resin is formed into a cylindrical shape by an inflation method using a ring die, and the resultant is cross-sectionally cut to produce substrate layer 21a in a ring shape (an endless belt shape).

Surface layer 21b is made of a cured product (integrally molded product) of a polymerizable monomer, and the monomer contains a compound represented by the following formula (1):

$$A\text{-}[(L\text{-}B)_k\text{-}D]_m(D)_l \quad (1)$$

In formula (1), A represents a tetra- or higher-valent organic group, B independently represents an alkylene oxide group having 4 to 15 carbon atoms, D independently represents a (meth)acryloyl group, L independently represents —(CO)— or a single bond, k independently represents an integer of 1 or more, l represents an integer of 0 to 3, m represents an integer of 2 or more, and a sum of l and m represents an integer of 3 or more.

A content of the compound represented by formula (1) can be appropriately determined as long as an effect of the compound represented by formula (1) can be attained. The content of the compound represented by formula (1) in the used monomer is preferably 25 mass % or more, more preferably 50 mass % or more, and particularly preferably 75 mass % or more.

As described above, A represents a tetra- or higher-valent organic group, and is preferably a tetra- to hexa-valent organic group. If A is a tri- or lower-valent organic group, it is difficult to form a three-dimensional crosslinked structure including a reactive functional group of a filler surface, and hence the strength of surface layer 21b is largely reduced. Besides, the surface of intermediate transfer member 21 is abraded when rubbed with a cleaning member described later, and hence, it is apprehended that the electrical characteristics may be changed due to thickness change of surface layer 21b of intermediate transfer member 21. If A is a hepta- or higher-valent organic group, a curing reaction is difficult to proceed, and hence it is apprehended that the curing reaction may take a long time and that large energy may be needed. As a result, it is apprehended that electrical influence of an unreacted functional group may occur and that the durability may be degraded.

The structure of the organic group is not particularly limited. The organic group is preferably derived from a polyfunctional acrylic monomer such as pentaerythritol or dipentaerythritol.

As described above, B in formula (1) represents an alkylene oxide group. The number of carbon atoms of the alkylene oxide group is 4 to 15, and is preferably 5 to 10. The carbon chain of the alkylene oxide group may be a straight chain or a branched chain. Besides, if the number of carbon atoms of the alkylene oxide group is 3 or less, the hydrophilicity of surface layer 21b unavoidably increases, and hence, the dynamic friction force increases under the HH environment because of the increase in adsorbed water. On the other hand, if the number of carbon atoms of the alkylene oxide group is 16 or more, it is difficult to polymerize the monomer, to form a uniform coating film, and to homogeneously disperse a metal oxide fine particle described later, and therefore, it becomes difficult to form surface layer 21b. Besides, if the carbon chain of the alkylene oxide group is a branched chain, steric hindrance in the vicinity of the structure of portion D in formula (1) so increases that the curing reaction is difficult to proceed, and hence, the formation of surface layer 21b tends to become difficult.

As described above, D in formula (1) independently represents a (meth)acryloyl group. Besides, as described above, L in formula (1) independently represents —(CO)— or a single bond. It is noted that a single bond refers to a structure in which portion A and portion B are directly bonded to each other with no atom present in portion L. If L is a single bond, merely an ether bond is formed, but if L is —(CO)—, an ester bond can be formed, which can make contribution to strength increase of surface layer 21b. From such a point of view, L is preferably —(CO)—.

As described above, k in formula (1) represents an integer of 1 or more, and preferably independently represents 1 or 2. If k is 0, the effect of the structure of D cannot be attained. On the other hand, if k is too large, the number of crosslinked bonds per unit weight becomes small (but not smaller than the case when A is 2 or less), and due to the strength reduction of surface layer 21b, a scratch caused thereon can easily become large. If scratches are accumulated, intermediate transfer member 21 is degraded, which tends to easily cause a wiping failure or a cleaning failure.

As described above, l in formula (1) represents an integer of 0 to 3, m represents an integer of 2 or more, and l+m represents an integer of 3 or more. Preferably, m represents an integer of 2 to 6, and l+m represents an integer of 3 to 6. If l is 4 or more and m is 1, the hydrophilicity of surface layer 21b becomes too high after the curing reaction. If the hydrophilicity of surface layer 21b is high, since the amount of adsorbed water increases, the dynamic friction force is presumed to increase particularly under the HH environment where water is easily adsorbed. Incidentally, although friction is caused among the cleaning member, intermediate transfer member 21 and a toner component in general, the friction is caused with adsorbed water further added under the HH environment, and hence, frictional resistance seems to increase. Preferably, l is an integer as small as possible, and is particularly preferably 0 (zero). Besides, m is preferably an integer as large as possible, and particularly preferably accords with the valence of A.

The compound contained in surface layer 21b can be analyzed by, for example, pyrolysis GC-MS, or by GC-MS or the like of a hydrolysate obtained after hydrolysis of an ester bond. A pyrolysis pattern in employing the pyrolysis GC-MS corresponds to an MS spectrum of pyrogram/chromatogram/component peculiar depending on the material and the temperature. Alternatively, the compound can be analyzed by the analysis of a hydrolysate obtained after the hydrolysis of an ester bond. When such an analysis is performed and the results are collated with an analysis result of a standard cured product in particular, identity can be determined even if the amount of a sample is small (namely, the thickness is too small to obtain a sufficient amount of a sample suitable to the NMR analysis).

The surface layer may contain a metal oxide fine particle obtained by subjecting an untreated metal oxide fine particle to a surface treatment with a prescribed surface treating agent (hereinafter sometimes referred to as the "treated metal oxide fine particle").

The untreated metal oxide fine particle is not particularly limited. Examples of the untreated metal oxide fine particle include fine particles of silica (silicon oxide), magnesium oxide, zinc oxide, lead oxide, aluminum oxide (alumina), tantalum oxide, indium oxide, bismuth oxide, yttrium oxide, cobalt oxide, copper oxide, manganese oxide, selenium oxide, iron oxide, zirconium oxide, germanium oxide, tin oxide, titanium oxide, niobium oxide, molybdenum oxide and vanadium oxide. From the viewpoint of imparting toughness and durability, the untreated metal oxide fine particle is preferably that of titanium oxide, aluminum oxide (alumina), zinc oxide or tin oxide, and further preferably aluminum oxide (alumina) or tin oxide.

The untreated metal oxide fine particle to be used can be produced by a general production method such as a gas phase method, a chlorine method, a sulfuric acid method, a plasma method or an electrolytic method.

The untreated metal oxide fine particle has a number average primary particle size of preferably 1 nm or more and 300 nm or less, and more preferably 3 to 100 nm. If the number average primary particle size is smaller than 1 nm, it is apprehended that sufficient abrasion resistance cannot be attained. On the other hand, if the number average primary particle size exceeds 300 nm, the dispersibility is so poor that the fine particle easily precipitates in a coating solution. Besides, there is a possibility that the particle impairs the light curing of surface layer 21b and hence sufficient abrasion resistance cannot be attained.

The number average primary particle size of the untreated metal oxide fine particle can be obtained by taking a 10,000-fold enlarged photograph with a scanning electron microscope (JEOL Ltd.) and by subjecting photograph images of randomly selected 300 particles (excluding agglomerated particles) taken in using a scanner to calculation using an automatic image processing analyzing apparatus (LUZEXAP; Nireco Corporation) with software version of Ver. 1.32.

On the other hand, the treated metal oxide fine particle carries, on its surface, a residue of a surface treating agent having a crosslinkable reactive group. The crosslinkable reactive group refers to a radically polymerizable functional group or a low surface energy functional group.

Examples of the radically polymerizable functional group include (meth)acryloyl groups. Besides, the crosslinkable reactive group is preferably a (meth)acryloyl group. Here, the term "(meth)acryloyl group" means an acryloyl group or a methacryloyl group. An example of the surface treating agent to be used for producing a treated metal oxide fine particle having a (meth)acryloyl group includes a compound having a (meth)acryloyl group.

The compound having a (meth)acryloyl group is preferably a compound having, in one molecule, a radically polymerizable functional group, such as a carbon-carbon double bond, and a polar group, such as an alkoxy group, to be coupled to a hydroxy group present on the surface of the untreated metal oxide fine particle.

It is preferable that the compound having a (meth)acryloyl group is polymerized (cured) through irradiation with active energy rays such as ultraviolet rays and electron beams to form a resin such as polystyrene or a poly(meth)acrylate. Incidentally, the compound having a (meth)acryloyl group is more preferably a silane compound having a (meth)acryloyl group from the viewpoint that such a compound can be cured with a small amount of light or in a short period of time.

An example of the compound having a (meth)acryloyl group includes a compound represented by the following formula (2):

$$R^{10}-\underset{\underset{X_m}{|}}{\overset{\overset{(R^9)_{3-m}}{|}}{Si}}$$ (2)

In formula (2), $R^9$ independently represents a hydrogen atom, an alkyl group having 1 to 10 carbon atoms or an aralkyl group having 1 to 10 carbon atoms, $R^{10}$ represents an organic group having a radically polymerizable functional group, X independently represents a halogen atom, an alkoxy group, an acyloxy group, an aminooxy group or a phenoxy group, and m represents an integer of 1 to 3.

Examples of the compound having a (meth)acryloyl group include compounds represented by structural formulas S-1 to S-30 shown in Table 1 below.

TABLE 1

| No. | Structural Formula |
|---|---|
| S-1 | $CH_2=CHSi(CH_3)(OCH_3)_2$ |
| S-2 | $CH_2=CHSi(OCH_3)_3$ |
| S-3 | $CH_2=CHSiCl_3$ |
| S-4 | $CH_2=CHCOO(CH_2)_2Si(CH_3)(OCH_3)_2$ |
| S-5 | $CH_2=CHCOO(CH_2)_2Si(OCH_3)_3$ |
| S-6 | $CH_2=CHCOO(CH_2)_2Si(OC_2H_5)(OCH_3)_2$ |
| S-7 | $CH_2=CHCOO(CH_2)_3Si(OCH_3)_3$ |
| S-8 | $CH_2=CHCOO(CH_2)_2Si(CH_3)Cl_2$ |
| S-9 | $CH_2=CHCOO(CH_2)_2SiCl_3$ |
| S-10 | $CH_2=CHCOO(CH_2)_3Si(CH_3)Cl_2$ |
| S-11 | $CH_2=CHCOO(CH_2)_3SiCl_3$ |
| S-12 | $CH_2=C(CH_3)COO(CH_2)_2Si(CH_3)(OCH_3)_2$ |
| S-13 | $CH_2=C(CH_3)COO(CH_2)_2Si(OCH_3)_3$ |
| S-14 | $CH_2=C(CH_3)COO(CH_2)_3Si(CH_3)(OCH_3)_2$ |
| S-15 | $CH_2=C(CH_3)COO(CH_2)_3Si(OCH_3)_3$ |
| S-16 | $CH_2=C(CH_3)COO(CH_2)_2Si(CH_3)Cl_2$ |
| S-17 | $CH_2=C(CH_3)COO(CH_2)_2SiCl_3$ |
| S-18 | $CH_2=C(CH_3)COO(CH_2)_3Si(CH_3)Cl_2$ |
| S-19 | $CH_2=C(CH_3)COO(CH_2)_3SiCl_3$ |
| S-20 | $CH_2=CHSi(C_2H_5)(OCH_3)_2$ |
| S-21 | $CH_2=C(CH_3)Si(OCH_3)_3$ |
| S-22 | $CH_2=C(CH_3)Si(OC_2H_5)_3$ |
| S-23 | $CH_2=CHSi(OCH_3)_3$ |
| S-24 | $CH_2=C(CH_3)Si(CH_3)(OCH_3)_2$ |
| S-25 | $CH_2=CHSi(CH_3)Cl_2$ |
| S-26 | $CH_2=CHCOOSi(OCH_3)_3$ |
| S-27 | $CH_2=CHCOOSi(OC_2H_5)_3$ |
| S-28 | $CH_2=C(CH_3)COOSi(OCH_3)_3$ |
| S-29 | $CH_2=C(CH_3)COOSi(OC_2H_5)_3$ |
| S-30 | $CH_2=C(CH_3)COO(CH_2)_3Si(OC_2H_5)_3$ |

Besides, the compound having a (meth)acryloyl group may be a compound except for the compound represented by the aforementioned formula (2). Examples of such a compound having a (meth)acryloyl group include compounds represented by the following formulas (S-31) to (S-33):

(S-31)

(S-32)

(S-33)

Alternatively, the compound having a (meth)acryloyl group may be an epoxy-based compound. Examples of such a compound having a (meth)acryloyl group include compounds represented by the following formulas (S-34) to (S-36):

(S-34)

(S-35)

(S-36)

Besides, the "low surface energy functional group" refers to a functional group introduced by a surface treating agent used for lowering the surface free energy of a metal oxide fine particle. Examples of the low surface energy functional group include a functional group in which silicone oil is bonded to a silicon atom of a silane coupling agent, and a polyfluoroalkyl group. Examples of the surface treating agent used for producing such a treated metal oxide fine particle include a straight silicone oil (such as methyl hydrogen polysiloxane (MHPS)) and a modified silicone oil.

As a method for producing the treated metal oxide fine particle, for example, a method in which 100 parts by weight of the untreated metal oxide fine particle, 0.1 to 200 parts by weight of a surface treating agent and 50 to 5,000 parts by weight of a solvent are mixed using a wet-type medium dispersing apparatus may be employed.

Alternatively, as another method for producing the treated metal oxide fine particle, for example, a method in which a slurry (a suspension of a solid particle) containing the untreated metal oxide fine particle and a surface treating agent is stirred may be employed. During the stirring, an aggregate of the untreated metal oxide fine particle is crushed, and at the same time, a surface treatment of the untreated metal oxide fine particle proceeds. Thereafter, the metal oxide fine particle is taken out by removing the solvent. Thus, the metal oxide fine particle having been homogeneously and finely surface treated with the surface treating agent can be obtained.

A surface treatment amount of the surface treating agent (i.e., a coating amount of the surface treating agent in the untreated metal oxide fine particle) is preferably 0.1 to 60 mass %, and particularly preferably 5 to 40 mass % with respect to the metal oxide fine particle.

The wet-type medium dispersing apparatus refers to an apparatus including beads filled as a medium in a vessel and a stirring disc attached vertically to a rotation axis so that a crushing/dispersing step can be executed by crushing aggregated particles of the metal oxide fine particle by rapidly rotating the stirring disc. The wet-type medium dispersing apparatus is not particularly limited as long as the untreated metal oxide fine particle can be sufficiently dispersed as well as can be surface treated during the surface treatment of the untreated metal oxide fine particle, and any one of various types such as vertical or lateral types and continuous or batch types can be employed. Specifically, a sand mill, an Ultra Visco Mill, a pearl mill, a grain mill, a Dyno mill, an agitator mill, a dynamic mill or the like can be used. In such a dispersing apparatus, fine grinding and dispersion are carried out through impact crushing, rubbing, shearing and application of shearing stress using a grinding medium such as a ball or a bead. As the bead to be used in the dispersing apparatus, balls made of raw materials of glass, alumina, zircon, zirconia, steel and flint stone can be used, but a bead made of zirconia or zircon is particularly preferred. Besides, as the size of the bead, one having a diameter of about 1 to 2 mm is generally used, and one having a diameter of about 0.3 to 1.0 mm is preferably used in the present embodiment.

As the disc and the inner wall of the vessel used in the wet-type medium dispersing apparatus, any of those made of various materials such as stainless steel, nylon and ceramics can be used, and one made of a ceramic such as zirconia or silicon carbide is particularly preferably used in the present embodiment.

A content of the treated metal oxide fine particle in surface layer 21b is preferably 5 to 40 parts by weight, and more preferably 10 to 30 parts by weight. If the content of the metal oxide fine particle is smaller than 5 parts by weight, it is apprehended that the hardness of intermediate transfer member 21 is lowered to degrade the transferability and durability. On the other hand, if the content of the treated metal oxide fine particle exceeds 40 parts by weight, it is apprehended that surface layer 21b becomes fragile and that coating irregularities may be caused during production described later.

Surface layer 21b may further contain an additional additive. An additive is appropriately added to surface layer 21b through, for example, addition to a curable composition.

The additional additive may be added to the curable composition for imparting an appropriate physical property in the production of surface layer 21b. Examples of the additional additive include a polymerization initiator, an organic solvent, a light stabilizer, a UV absorber, a catalyst, a colorant, an antistatic agent, a lubricant, a leveling agent, an antifoaming agent, a polymerization promoter, an antioxidant, a flame retardant, an infrared absorber, a surfactant and a surface modifier.

Surface layer 21b can be produced by any of known general methods. For example, surface layer 21b can be formed by applying, to substrate layer 21a, a curable composition containing the above-described metal oxide fine particle and the monomer represented by the aforementioned formula (1), and irradiating the resultant with active energy rays with a prescribed light intensity.

(Structure of Image Forming Apparatus)

An image forming apparatus according to the present embodiment can employ any of known structures without special limitation as long as it includes the aforementioned intermediate transfer member.

Figure 2:
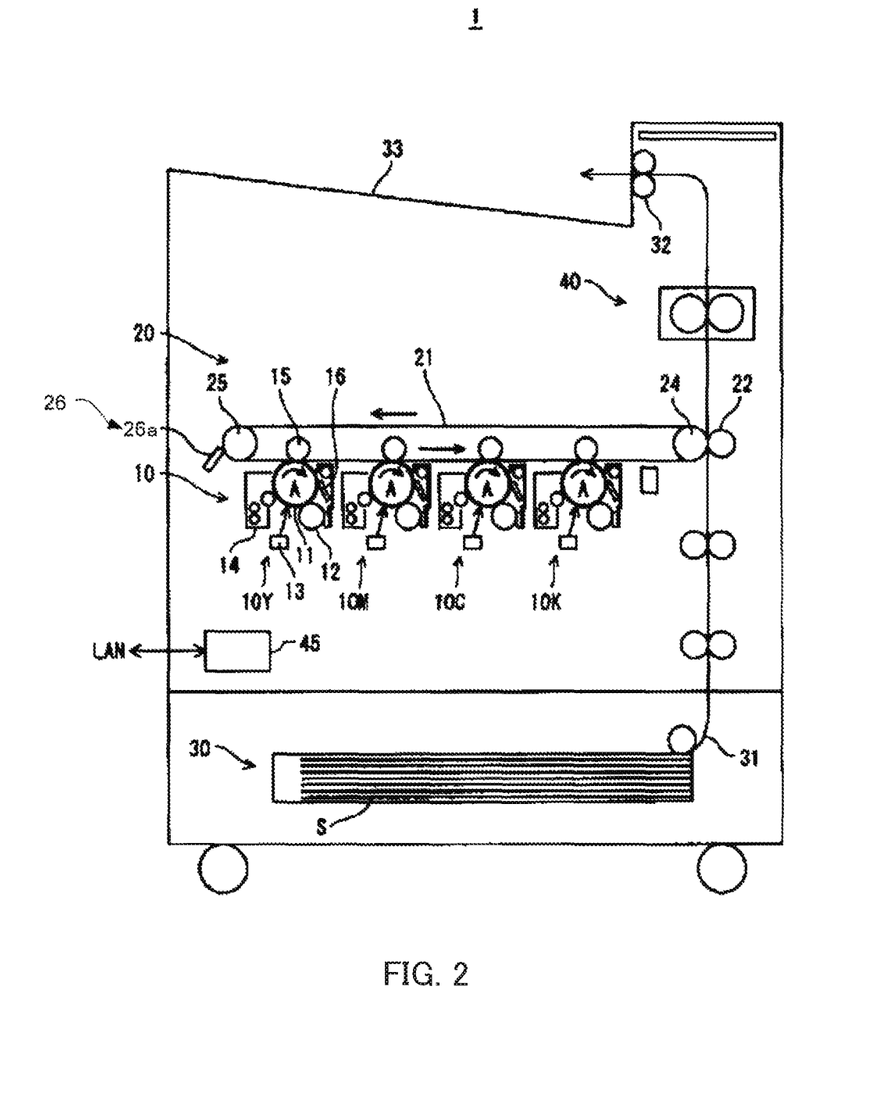
FIG. 2 is a schematic diagram of an example of an image forming apparatus according to the embodiment of the present invention.

FIG. 2 is a schematic diagram illustrating an example of the image forming apparatus of the present embodiment.

As illustrated in FIG. 2, image forming apparatus 1 forms an image on a recording medium by a known electrophotographic method, includes image forming section 10, intermediate transfer unit 20, sheet conveying section 30, fixing device 40 and control section 45, and selectively executes color or monochrome printing on the basis of a print job accepted through a network (such as a LAN) from an external terminal (not illustrated).

Image forming section 10 includes image forming units 10Y, 10M, 10C and 10K respectively corresponding to developing colors of yellow (Y), magenta (M), cyan (C) and black (K). Image forming unit 10Y includes photoconductor drum 11 working as an electrostatic latent image carrier, and charging device 12, exposing device 13, developing device 14, primary transfer roller 15, and photoconductor cleaning apparatus 16 disposed around photoconductor drum 11, and belt cleaning apparatus 26 and secondary transfer roller 22.

Photoconductor drum 11 is, for example, a negative charge-type organic photoconductor, and rotates in a direction illustrated with arrow A. Charging device 12 charges the circumferential surface of photoconductor drum 11. Charging device 12 is, for example, a corona charger. Charging device 12 may be a contact charging device that charges photoconductor drum 11 with a contact charging member such as a charging roller, a charging brush or a charging blade brought into contact with photoconductor drum 11. Exposing device 13 includes, for example, a semiconductor laser working as a light source, and a light deflection apparatus (a polygon motor) for irradiating photoconductor drum 11 with a laser beam in accordance with an image to be formed.

Developing device 14 holds a developer containing a toner therein, and develops an electrostatic latent image formed on photoconductor drum 11 with the toner so as to form a toner image on photoconductor drum 11. In other words, a toner image is thus carried on the electrostatic latent image carrier. Here, the term "toner image" refers to a state where the toner is collected in the form of an image.

Any of known toners can be used as the toner. The toner may be a one-component developer or a two-component developer. The one-component developer consists of a toner particle. The two-component developer consists of a toner particle and a carrier particle. The toner particle is constituted by a toner base particle and an additive adhering to the surface thereof such as silica or a lubricant. The toner base particle is constituted by, for example, a binder resin, a colorant and a wax.

The lubricant is not particularly limited. Examples of the lubricant include metal soaps such as zinc stearate, zinc palmitate, zinc myristate, zinc laurate, zinc behenate, magnesium stearate, calcium stearate and aluminum stearate, various fatty acids, fatty acid amides, fatty acid esters, aliphatic alcohols having 18 to 70 carbon atoms, polyethylenes, various waxes, polytetrafluoroethylene (PTFE), and various inorganic materials having a layered crystal structure (such as boron nitride, melamine cyanurate, molybdenum disulfide, graphite fluoride and mica), and any of these known lubricants can be used. From the viewpoint of easiness in spreading, the lubricant is preferably a metal soap such as a stearate or a fatty acid zinc salt, and is particularly preferably zinc stearate. Besides, the particle size of the lubricant is also not particularly limited, but the average particle size is preferably 10 μm or less because the number of particles supplied per unit area can be increased if the size is smaller, and hence spreading efficiency can be increased to easily exhibit an effect of reducing the dynamic friction force.

Intermediate transfer unit 20 includes intermediate transfer member 21 stretched over driving roller 24 and driven roller 25 and caused to circularly run in an arrow direction. Intermediate transfer member 21 is in the shape of a seamless belt (namely, in the shape of an endless belt), and is in a cylindrical shape obtained through injection molding or centrifugal molding of a resin material into a desired circumferential length determined in design.

Belt cleaning apparatus 26 has cleaning member 26a. Secondary transfer roller 22 drives together with driven roller 25, so as to secondarily transfer, onto a recording medium, the toner image having been primarily transferred onto intermediate transfer member 21.

When the color printing (color mode) is executed, toner images in corresponding colors are formed respectively on photoconductor drums 11 of image forming units 10Y, 10M, 10C and 10K, and the respective toner images thus formed are transferred onto intermediate transfer member 21. Image forming operations of forming these images of the colors Y, M, C and K are executed with timing shifted from the upstream side to the downstream side, so that the toner images of the respective colors can be transferred in a superimposed manner onto the same position of intermediate transfer member 21 running during the operations.

Sheet conveying section 30 sends out sheets S, that is, recording media, one by one from a sheet feeding cassette in timing with the image formation described above, and conveys each of sent sheets S on conveyance path 31 toward secondary transfer roller 22.

After the secondary transfer of the toner images of the respective colors, resultant sheet S is conveyed to fixing device 40, fixing device 40 heats and presses sheet S so as to melt and fix the toner onto the surface of sheet S, and resultant sheet S is ejected onto sheet tray 33 by sheet ejection roller 32. In this manner, an image corresponding to the toner images is formed on the recording medium.

The operation for executing the color mode has been described so far, and if the monochrome printing (monochrome mode) of, for example, a black color alone is executed, merely image forming unit 10K for black is driven, and in the same manner as in the above-described operation, the charging, exposing, developing, transferring and fixing steps for the black color are executed to form (print) a black image on recording sheet S.

Control section 45 controls the respective sections based on data of the print job accepted through a network from an external terminal so as to smoothly execute a printing operation.

(Image Forming Method)

An image forming method according to an embodiment of the present invention includes a primary transferring step of transferring a toner image carried on photoconductor drum 11 onto intermediate transfer member 21; a secondary transferring step of transferring the toner image carried on intermediate transfer member 21 onto a recording medium; and a cleaning step of removing, after the secondary transferring step, remaining toners remaining on a surface of intermediate transfer member 21 by bringing cleaning member 26a into contact with the surface of intermediate transfer member 21, and in addition, includes, for example, a charging step, an exposing step, a developing step, a transferring step and a fixing step. Besides, the image forming method may further include a step of applying, to intermediate transfer member 21, a lubricant having an average particle size of 10 μm or less.

In order to practice the image forming method of the present embodiment, an apparatus having a similar structure to image forming apparatus 1 described above can be used.

In the charging step, a photoconductor drum is charged by a charging device or the like. The photoconductor drum is, for example, a negative charge-type organic photoconductor having photoconductivity. The organic photoconductor includes, for example, a conductive support, a charge generation layer, a charge transport layer and a surface layer.

In the exposing step, the charged photoconductor drum is irradiated with light by an exposing device or the like, so as to form an electrostatic latent image thereon.

In the developing step, a toner is supplied to photoconductor drum on which the electrostatic latent image has been formed, so as to form a toner image in accordance with the electrostatic latent image. The developing step can be performed, for example, by using a known developing device provided in the electrophotographic image forming apparatus.

In the transferring step, a transfer unit is used for transferring the toner image having been formed on photoconductor drum 11 onto a recording medium. In the present embodiment, the transferring step includes a primary transferring step and a secondary transferring step. In the primary transferring step, primary transfer roller 15 is used for electrostatically transferring the toner image having been formed on photoconductor drum 11 onto intermediate transfer member 21. In the secondary transferring step, a secondary transfer roller is used for transferring the toner image having been transferred onto intermediate transfer member 21 to a recording medium. In this manner, the image forming method of the present embodiment is substantially an intermediate transfer method.

In the fixing step, the toner image having been transferred onto the recording medium is fixed on the recording medium by a known fixing device or the like.

Incidentally, a drum cleaning step of removing a portion of the toner remaining on photoconductor drum 11 may be performed on photoconductor drum 11 after the primary transfer. Besides, a belt cleaning step of removing a portion of the toner remaining on intermediate transfer member 21 may be performed on intermediate transfer member 21 after the secondary transfer. The belt cleaning step is performed by belt cleaning apparatus 26 including belt cleaning member (cleaning member) 26a. Belt cleaning apparatus 26 cleans away a toner particle remaining on the surface of intermediate transfer member 21 by bringing cleaning member 26a into contact with the surface of intermediate transfer member 21 after transferring the toner image onto the recording medium. Examples of a method for cleaning away the remaining toner particle include a method using a pressed cleaning blade, a method using a pressed blade dedicated to apply a lubricant, a method using a pressed brush, a method using a pressed rubber roller, a method using a pressed sponge roller, and a method using a pressed thin metal plate (having a thickness of 0.3 mm or less). The method for cleaning away the remaining toner particle is preferably a method using a cleaning blade from the viewpoint of reducing the number of necessary components.

The image forming method may further include a step of applying a lubricant to the intermediate transfer member. The step of applying a lubricant to intermediate transfer member 21 is not particularly limited as long as a lubricant can be applied to intermediate transfer member 21. A solid lubricant may be used to be shaved off by a brush or the like and directly applied to intermediate transfer member 21, or a toner particle containing a lubricant in a toner base particle may be used for supplying the lubricant to intermediate transfer member 21. In the present embodiment, the step of applying a lubricant to intermediate transfer member is a step of supplying a lubricant to intermediate transfer member by using a toner particle containing the lubricant in a toner base particle. Incidentally, no matter which application method is employed for the applying step, an average particle size of the lubricant is 10 μm or less.

As described so far, intermediate transfer member 21 described above is used in the present embodiment, and therefore, the cleaning performance of cleaning member 26a can be improved while suppressing the increase in the dynamic friction force between cleaning member 26a and intermediate transfer member 21.

EXAMPLES

The present invention will now be specifically described with reference to examples, and it is noted that the present invention is not limited to these examples.

1. Production of Intermediate Transfer Member
(1) Preparation of Monomers

As monomers to be used for forming a surface layer, sixteen monomers shown in Table 2 below were prepared. In Table 2, A, B, D and L respectively indicate corresponding structures in the following formula (1), and k, l and m respectively indicate corresponding numerals in formula (1):

$$A\text{-}[(L\text{-}B)_k\text{-}D]_m(D)_l \qquad (1)$$

A in formula (1) is any one of structures A1 to A3, and structures A1 to A3 shown in Table 2 are as follows:

(A1)

(A-2)

(A-3)

Besides, B in formula (1) is any one of structure B1 and structures shown in Table 2, and structure B1 shown in Table 2 is as follows:

(B1)

Furthermore, L in formula (1) is any one of structures L1 and L2, and structure L1 shown in Table 2 is as follows and structure L2 is a single bond:

<Production of Intermediate Transfer Member No. 1>
(1) Production of Substrate Layer A resin mixture was obtained by melting and mixing, in a single shaft extruder, 100 parts by weight of a polyphenylene sulfide resin (E2180; Toray Industries, Inc.), 21 parts by weight of a conductive filler (carbon black #3030B; Mitsubishi Chemical Corporation), 1 part by weight of a

TABLE 2

| | A | | | | | | | |
|---|---|---|---|---|---|---|---|---|
| Monomer No. | Structure | Valence | B | D | L | k | l | m |
| 1 | A1 | 6 | —(CH$_2$)$_5$—O— | Acryloyl Group | L1 | 1 | 0 | 6 |
| 2 | A1 | 6 | —(CH$_2$)$_5$—O— | Acryloyl Group | L1 | 1 | 2 | 4 |
| 3 | A1 | 6 | —(CH$_2$)$_5$—O— | Acryloyl Group | L1 | 1 | 3 | 3 |
| 4 | A1 | 6 | —(CH$_2$)$_5$—O— | Acryloyl Group | L1 | 2 | 0 | 6 |
| 5 | A1 | 6 | —(CH$_2$)$_4$—O— | Acryloyl Group | L1 | 1 | 0 | 6 |
| 6 | A1 | 6 | —(CH$_2$)$_{10}$—O— | Acryloyl Group | L1 | 1 | 0 | 6 |
| 7 | A1 | 6 | —(CH$_2$)$_{15}$—O— | Acryloyl Group | L1 | 1 | 0 | 6 |
| 8 | A1 | 6 | —(CH$_2$)$_5$—O— | Methacryloyl Group | L1 | 1 | 0 | 6 |
| 9 | A1 | 6 | —(CH$_2$)$_5$—O— | Acryloyl Group | L2 | 1 | 0 | 6 |
| 10 | A2 | 4 | —(CH$_2$)$_5$—O— | Acryloyl Group | L1 | 1 | 0 | 4 |
| 11 | A1 | 6 | B1 | Acryloyl Group | L1 | 1 | 0 | 6 |
| 12 | A1 | 6 | —(CH$_2$)$_5$—O— | Acryloyl Group | L1 | 1 | 4 | 2 |
| 13 | A1 | 6 | —(CH$_2$)$_3$—O— | Acryloyl Group | L1 | 1 | 0 | 6 |
| 14 | A3 | 3 | —(CH$_2$)$_5$—O— | Acryloyl Group | L1 | 1 | 0 | 2 |
| 15 | A1 | 6 | —(CH$_2$)$_5$—O— | Acryloyl Group | L1 | 0 | 0 | 6 |
| 16 | A1 | 6 | —(CH$_2$)$_5$—O— | Acryloyl Group | L1 | 1 | 5 | 1 | graft copolymer (Modiper (R) A4400; Nippon Oil & Fats Co., Ltd.) and 0.15 parts by weight of a lubricant (calcium montanate).

Next, a ring die having a slit discharge port in the shape of a seamless belt was attached to the tip of the single shaft extruder. The resin mixture obtained as described above was extruded into the shape of a seamless belt. Subsequently, the resin mixture having been extruded into the seamless belt shape was cooled and cured by externally inserting into a cylindrical cooling tube provided in a position where the mixture was discharged, and thus, a substrate layer for an intermediate transfer member in a seamless cylindrical shape (an endless belt shape) having a thickness of 120 µm was produced.

(2) Preparation of Surface-Treated Metal Oxide Fine Particle

One hundred (100) parts by weight of a tin oxide fine particle, used as an untreated metal oxide fine particle, having an average particle size of 34 nm, 2.5 parts by weight of 3-acryloxypropyltrimethoxysilane (KBM-5103; Shin-Etsu Chemical Co., Ltd.), used as a surface treating agent, and 80 parts by weight of a solvent (a mixed solvent of toluene and isopropyl alcohol in a volume ratio of 1:1) were mixed, a wet-type medium dispersing apparatus was used for dispersing the resultant, and then the solvent was removed therefrom. Subsequently, the resultant was dried at 150° C. for 30 minutes to obtain a surface-treated tin oxide particle (P-1) as a surface-treated metal oxide fine particle.

(3) Preparation of Coating Solution for Forming Surface Layer

A coating solution for forming a surface layer was prepared by dissolving and dispersing, in a solvent of MIBK (methyl isobutyl ketone), 75 parts by weight of monomer No. 1 used as a monomer, 150 parts by weight of the surface-treated metal oxide fine particle (P-1) and 4 parts by weight of a photopolymerization initiator (Irgacure (R) TPO; BASF) to a solid concentration of 20 mass %.

(4) Formation of Surface Layer

A coating film was formed on the outer peripheral surface of the substrate layer by applying the coating solution for forming a surface layer into a dry thickness of 3.8 µm by a dip coating method using a coating apparatus (supplied amount of coating solution: 1 L/min). Next, the thus formed coating film was irradiated with ultraviolet rays used as actinic radiation (active energy rays) under the following irradiation conditions, so as to cure the coating film to form a surface layer. In this manner, intermediate transfer member No. 1 was obtained. Incidentally, the irradiation with ultraviolet rays was performed with a light source fixed while rotating a precursor including the coating film formed on the outer peripheral surface of the resin substrate layer at a peripheral speed of 60 mm/s.

(Conditions for Ultraviolet Rays Irradiation)

Light Source: 365 nm LED light source (SPX-TA; Eye Graphics Co., Ltd.)

Distance between Irradiation Port and Surface of Coating Film: 60 mm

Atmosphere: nitrogen

Irradiation Intensity: 1.4 J/cm$^2$

Irradiation Time (Time of Rotating Precursor): 240 seconds.

<Production of Intermediate Transfer Members No. 2 to No. 16>

Intermediate transfer members No. 2 to No. 16 were produced in the same manner as intermediate transfer member No. 1 except that monomers No. 2 to No. 16 were respectively used as the monomer.

2. Evaluation (1) Preparation of Toner

Evaluation toners No. 1 to No. 4 obtained by changing, as shown in Table 3 below, a particle size and a content of zinc stearate in color toners (of four colors of Y, M, C, and K) for a Bizhub C554e were used as toners. Table 3 shows an average particle size (in median diameter) and a weight part ratio of zinc stearate added to each of the toners. The weight part ratio refers to an amount in parts by weight added to 100 parts by weight of a toner base particle.

TABLE 3

| Evaluation Toner No. | Average Particle Size of Zinc Stearate (µm) | Weight Part Ratio |
|---|---|---|
| 1 | 15 | 0.25 |
| 2 | 10 | 0.25 |
| 3 | 5 | 0.25 |
| 4 | 1 | 0.25 |

(2) Preparation of Evaluation Apparatus

As an evaluation apparatus, a modified apparatus of a commercially available full-color multifunctional peripheral (Bizhub (R) C554e; Konica Minolta, Inc.) was prepared. Specifically, a modified apparatus including a transfer unit that used any one of intermediate transfer members No. 1 to No. 16 and was connected to a strain measuring apparatus was prepared. In each of the thus prepared evaluation apparatuses, any one of evaluation toners No. 1 to No. 4 of cyan color was attached to a cleaning blade (a cleaning member). Besides, any one of evaluation cyan toners No. 1 to No. 4 was attached in an amount of 0.4 g/m$^2$ to the transfer belt in a whole region to be brought into contact with the cleaning blade in the widthwise direction of the transfer belt and in a region immediately in front of the cleaning blade and corresponding to ⅓ of the whole circumference in the circumferential direction of the transfer belt. Table 4 shows the evaluation apparatus No., the intermediate transfer member No., and the evaluation toner No. Incidentally, a cleaning blade UW085 (NOK Corporation, thickness: 2.0 mm) was used as the cleaning blade, and a contact force to the intermediate transfer member was set to 30 N/m, an effective contact angle against the intermediate transfer member was set to 14°, and a free length was set to 9 mm.

TABLE 4

| | Evaluation Apparatus No. | Intermediate Transfer Member No. | Evaluation Toner No. |
|---|---|---|---|
| Example | 1 | 1 | 1 |
| | 2 | 1 | 2 |
| | 3 | 1 | 3 |
| | 4 | 1 | 4 |
| | 5 | 2 | 3 |
| | 6 | 3 | 3 |
| | 7 | 4 | 3 |
| | 8 | 5 | 3 |
| | 9 | 6 | 3 |
| | 10 | 7 | 3 |
| | 11 | 8 | 3 |
| | 12 | 9 | 3 |
| | 13 | 10 | 3 |
| | 14 | 11 | 3 |

TABLE 4-continued

|  | Evaluation Apparatus No. | Intermediate Transfer Member No. | Evaluation Toner No. |
|---|---|---|---|
| Comparative Example | 15 | 12 | 3 |
|  | 16 | 13 | 3 |
|  | 17 | 14 | 3 |
|  | 18 | 15 | 3 |
|  | 19 | 16 | 3 |

3. Evaluation (1) Evaluation of Torque

Torque was evaluated respectively under the LL environment (10° C. and 20% RH), the NN environment (20° C. and 50% RH) and the HH environment (30° C. and 80% RH). The torque evaluation was performed by driving the intermediate transfer member for 60 seconds or more at a running speed of 280 mm/sec. in each of the evaluation apparatuses No. 1 to No. 19 after resetting to set a torque value immediately before the driving to 0 (zero). In a range of 50 to 60 seconds after starting the driving, driving torque data was obtained by converting a current value obtained by the strain measuring apparatus into a torque at an interval of 20 msec., the thus obtained driving torque data was averaged, and the torque was calculated by calculating a difference from the state where the torque was 0 (zero) immediately before the driving. For comparison, driving torque data (as a reference value) was obtained similarly by using a genuine product of the intermediate transfer member of the commercially available full-color multifunctional peripheral (Bizhub C554e; Konica Minolta, Inc.). The torque evaluation of each evaluation apparatus (each intermediate transfer member) was compared in terms of a ratio to the reference value.

A: The ratio was 1.5 or less under all of the LL environment, the NN environment and the HH environment.

B: The ratio was higher than 1.5 and 2.5 or less under any of the LL environment, the NN environment and the HH environment.

C: The ratio was higher than 2.5 under any of the LL environment, the NN environment and the HH environment.

Table 5 shows the evaluation apparatus No., the intermediate transfer member No., and the torque ratios and the evaluation results obtained under the respective environments.

As shown in Table 5, intermediate transfer members No. 1 to No. 11 (i.e., evaluation apparatuses No. 1 to No. 14) each including the surface layer containing a cured product of the monomer represented by formula (1) had a satisfactory torque ratio of 2.5 or less to the reference value under all of the LL environment, the NN environment and the HH environment.

On the other hand, as shown in Table 5, the intermediate transfer members No. 12 to No. 16 (i.e., the evaluation apparatuses No. 15 to No. 19) each containing a monomer except for the monomer represented by formula (1) had a defective torque ratio exceeding 2.5 to the reference value under any one of the LL environment, the NN environment and the HH environment.

(2) Evaluation of Cleaning Performance

The cleaning performance was evaluated under the LL environment and the HH environment on the basis of a wiping failure test performed after preliminary printing and abrasion wear of the cleaning blade. Here, the preliminary printing was performed by printing a character mixed chart at a coverage of each color of 2% on 10,000 A4-size sheets in continuous printing mode. Incidentally, even if abnormal noise occurred during the preliminary printing, the printing was performed to the last, and determination was made based on a result of the wiping failure test. If the test could not be continued due to blade peeling, the test was ceased, and the result of the wiping failure test was determined as rejected.

(A) Wiping Failure Test

In the wiping failure test, with the secondary transfer roller of each evaluation apparatus removed, an A3-size blue solid image was printed continuously on 2 sheets. Subsequently, with the secondary transfer roller attached again, an A3-size yellow solid image was immediately printed on 1 sheet. It was examined whether or not a magenta or cyan streak was caused on the thus obtained image. This test was repeated by five times, and the evaluation was made based on the following criteria. It is noted that CF paper (Konica Minolta, Inc.) was used as a recording medium.

A: No streaks observed in five times of the test
B: No streaks observed in four times of the test
C: Some streaks observed in two or more times of the test

TABLE 5

|  | Evaluation Apparatus No. | Intermediate Transfer Member No. | LL Environment | NN Environment | HH Environment | Evaluation |
|---|---|---|---|---|---|---|
| Example | 1 | 1 | 1.33 | 1.60 | 2.05 | B |
|  | 2 | 1 | 1.04 | 1.16 | 1.30 | A |
|  | 3 | 1 | 1.04 | 1.12 | 1.22 | A |
|  | 4 | 1 | 1.03 | 1.10 | 1.19 | A |
|  | 5 | 2 | 1.04 | 1.21 | 1.48 | A |
|  | 6 | 3 | 1.04 | 1.69 | 2.45 | B |
|  | 7 | 4 | 1.04 | 1.12 | 1.21 | A |
|  | 8 | 5 | 1.08 | 1.70 | 2.43 | B |
|  | 9 | 6 | 1.04 | 1.11 | 1.22 | A |
|  | 10 | 7 | 1.35 | 1.76 | 2.29 | B |
|  | 11 | 8 | 1.05 | 1.13 | 1.23 | A |
|  | 12 | 9 | 1.04 | 1.11 | 1.23 | A |
|  | 13 | 10 | 1.04 | 1.12 | 1.22 | A |
|  | 14 | 11 | 1.40 | 1.82 | 2.39 | B |
| Comparative Example | 15 | 12 | 1.03 | 2.32 | 3.72 | C |
|  | 16 | 13 | 1.04 | 2.35 | 3.71 | C |
|  | 17 | 14 | 1.35 | 1.72 | 3.10 | C |
|  | 18 | 15 | 1.16 | 2.74 | 4.31 | C |
|  | 19 | 16 | 1.12 | 2.59 | 4.10 | C |

(B) Abrasion Test

Figure 3:
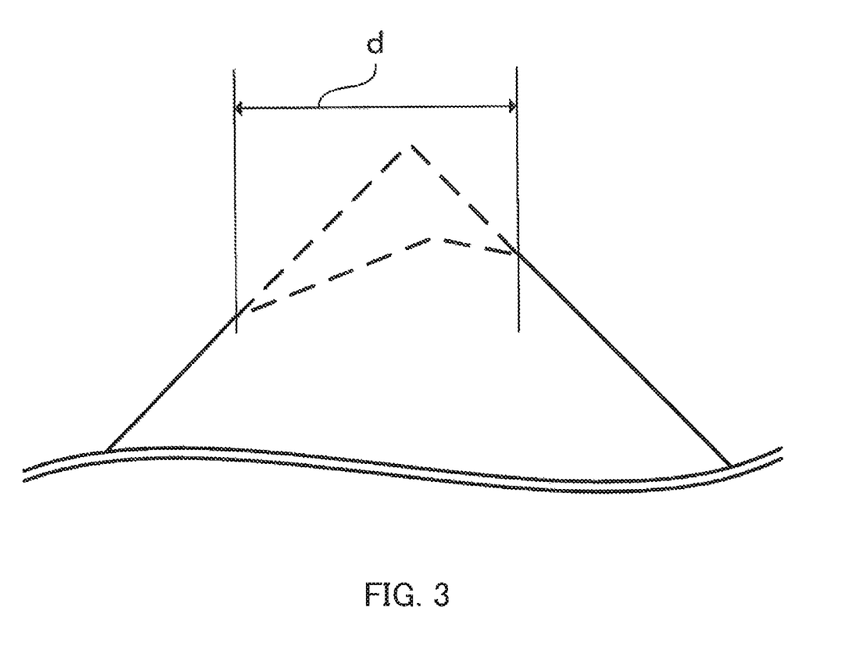
FIG. 3 is a diagram for explaining a maximum wear width of a cleaning member in an abrasion test.

FIG. 3 is a diagram for explaining a maximum wear width of the cleaning member (the cleaning blade) in an abrasion test. The maximum wear width of the cleaning blade in a portion thereof where the recording medium passed in the preliminary printing was measured. As illustrated in FIG. 3, the maximum wear width d of the cleaning blade was measured by observing, with a laser microscope (Vk-X100, Keyence Corporation; observed with a 150-fold objective lens and a step width of 0.1 μm), the vicinity of a contact portion with the intermediate transfer member with the cleaning blade having been used for the preliminary printing inclined at 45°. Here, the term "maximum wear width" means a length between the left end and the right end of a worn portion of the cleaning blade. Incidentally, the maximum wear width means the length between these ends of the worn portion of the cleaning blade even if an unworn portion is included therebetween.

A: The wear width of 5 μm or less
B: The wear width beyond 5 μm and 10 μm or less
C: The wear width beyond 10 μm (C) Evaluation of Peeling of Cleaning Blade In performing the preliminary printing for printing 10,000 A4-size sheets, if the printing could be performed without generating abnormal noise derived from peeling of the cleaning blade, it was determined as accepted (shown as "none"), and if abnormal noise occurred during the test, it was determined as rejected (shown as "noise").

Table 6 shows the evaluation apparatus No., the results of the wiping failure test, the wear widths and the evaluation results.

containing a cured product of a monomer except for the monomer represented by formula (1) exhibited a poor result at least one of the wiping failure test and the abrasion wear when the preliminary printing was performed under the LL environment or the HH environment.

INDUSTRIAL APPLICABILITY

According to the present invention, in a cleaning process for an intermediate transfer member of the electrophotographic method, the increase in the dynamic friction force of the intermediate transfer member is suppressed and the cleaning performance is improved. Therefore, according to the present invention, the cleaning performance can be improved regardless of the operating environment in an electrophotographic image forming apparatus as well as the image forming apparatus can be simplified, and hence, the image forming apparatus can be expected to be further widely used.

What is claimed is:

1. An intermediate transfer member, comprising a substrate layer, and a surface layer disposed on the substrate layer,
wherein the surface layer contains at least a cured product of a polymerizable monomer, and
the monomer contains a compound represented by the following formula (1):

$$\text{A-}[(L\text{-}B)_k\text{-}D]_m(D)_l \qquad (1)$$

wherein A represents a tetra- to hexa-valent organic group, B independently represents an alkylene oxide

TABLE 6

| | | | LL Environment | | | HH Environment | | |
| --- | --- | --- | --- | --- | --- | --- | --- | --- |
| | Evaluation Apparatus No. | Intermediate Transfer Member No. | Peeling | Results of Wiping Failure Test | Wear Width (μm) | Peeling | Results of Wiping Failure Test | Wear Width (μm) | Evaluation of Wear Width |
| Example | 1 | 1 | none | A | 3.2 | none | A | 7.3 | B |
| | 2 | 1 | none | A | 1.9 | none | A | 3.5 | A |
| | 3 | 1 | none | A | 1.6 | none | A | 2.9 | A |
| | 4 | 1 | none | A | 1.5 | none | A | 2.6 | A |
| | 5 | 2 | none | A | 2.4 | none | A | 4.7 | A |
| | 6 | 3 | none | A | 3.9 | none | B | 9.5 | B |
| | 7 | 4 | none | A | 1.5 | none | A | 2.9 | A |
| | 8 | 5 | none | A | 4.2 | none | B | 9.5 | B |
| | 9 | 6 | none | A | 1.6 | none | A | 3.0 | A |
| | 10 | 7 | none | B | 5.5 | none | B | 9.0 | B |
| | 11 | 8 | none | A | 1.9 | none | A | 3.3 | A |
| | 12 | 9 | none | A | 1.7 | none | A | 3.0 | A |
| | 13 | 10 | none | A | 2.2 | none | A | 4.8 | A |
| | 14 | 11 | none | B | 4.2 | none | B | 9.4 | B |
| Comparative Example | 15 | 12 | none | B | 6.5 | noise | C | 21.2 | C |
| | 16 | 13 | none | B | 6.6 | noise | C | 22.0 | C |
| | 17 | 14 | none | C | 12.9 | none | C | 17.4 | C |
| | 18 | 15 | none | B | 7.4 | noise | C | 23.0 | C |
| | 19 | 16 | none | B | 7.2 | noise | C | 22.1 | C |

As shown in Table 6, intermediate transfer members No. 1 to No. 11 (i.e., evaluation apparatuses No. 1 to No. 14) each including the surface layer containing a cured product of the monomer represented by formula (1) exhibited an excellent result in the wiping failure test and had a little abrasion wear no matter whether the preliminary printing was performed under the LL environment or the HH environment.

On the other hand, as shown in Table 6, intermediate transfer members No. 12 to No. 16 (i.e., evaluation apparatuses No. 15 to No. 19) each including the surface layer group having 4 to 15 carbon atoms, D independently represents a (meth)acryloyl group, L independently represents —(CO)— or a single bond, k independently represents an integer of 1 or 2, l represents an integer of 0 to 3, m represents an integer of 2 to 6, and a sum of l and m represents an integer of 3 to 6.

2. The intermediate transfer member according to claim 1, wherein in the compound represented by formula (1), B independently represents a straight chain alkylene oxide group having 5 to 10 carbon atoms, and L represents —(CO)—.

3. The intermediate transfer member according to claim 1, wherein in the compound represented by formula (1), A represents a tetra- or hexa-valent organic group, B independently represents a straight chain alkylene oxide group having 5 or 10 carbon atoms, L represents —(CO)—, m represents an integer of 4 or 6, and the sum of l and m represents an integer of 4 or 6.

4. The intermediate transfer member according to claim 3, wherein in the compound represented by formula (1), A has any one of the following structures A1 and A2:

5. The intermediate transfer member according to claim 1, wherein the surface layer contains a metal oxide fine particle carrying, on a surface thereof, a residue of a surface treating agent having a crosslinkable reactive group.

6. The intermediate transfer member according to claim 5, wherein the crosslinkable reactive group is a (meth)acryloyl group.

7. An image forming apparatus, comprising:
the intermediate transfer member according to claim 1 for carrying a toner image having been carried on a photoconductor to transfer the toner image onto a recording medium; and
a cleaning apparatus for cleaning away toner particles remaining on a surface of the intermediate transfer member by bringing a cleaning member into contact with the surface of the intermediate transfer member from which the toner image has been transferred onto the recording medium.

8. An image forming method, comprising:
a primary transferring step of transferring a toner image carried on a photoconductor onto an intermediate transfer member;
a secondary transferring step of transferring the toner image carried on the intermediate transfer member onto a recording medium; and
a cleaning step of cleaning away remaining toners remaining on a surface of the intermediate transfer member by bringing a cleaning member into contact with the surface of the intermediate transfer member after the secondary transferring step,
wherein the intermediate transfer member according to claim 1 is used as the intermediate transfer member.

9. The image forming method according to claim 8, further comprising a step of applying a lubricant having an average particle size of 10 μm or less to the intermediate transfer member.

10. The image forming method according to claim 9, wherein a toner particle containing the lubricant in a toner base particle is used, and in the step of applying a lubricant to the intermediate transfer member, the lubricant is supplied to the intermediate transfer member using the toner particle.

11. The intermediate transfer member according to claim 1, wherein the tetra- to hexa-valent organic group is derived from a polyfunctional acrylic monomer.

* * * * *